United States Patent [19]

Coulin

[11] Patent Number: 4,550,647
[45] Date of Patent: Nov. 5, 1985

[54] PISTON PIN AND PISTON, NOTABLY FOR AN INTERNAL COMBUSTION ENGINE, EQUIPPED WITH SAID PIN

[75] Inventor: Jean-Paul Coulin, Montmorency, France

[73] Assignee: Societe d'Etudes de Machines Thermiques (SEMT), St. Denis, France

[21] Appl. No.: 679,600

[22] Filed: Dec. 7, 1984

Related U.S. Application Data

[63] Continuation of Ser. No. 497,557, May 24, 1983, abandoned.

[30] Foreign Application Priority Data

May 28, 1982 [FR] France .................. 82 09424

[51] Int. Cl.[4] .................. F01B 31/10; F16J 1/08
[52] U.S. Cl. ........................... 92/157; 92/153; 92/187; 184/18; 123/41.38
[58] Field of Search ............... 92/155, 157, 158, 186, 92/156, 159, 160, 187; 184/7 D, 7 E, 7 F, 18 X, 24; 403/38, 39, 151, 152, 154, 155; 384/115, 123, 286, 292, 378; 123/41.37, 41.38; 308/2 R

[56] References Cited

U.S. PATENT DOCUMENTS

| | | | |
|---|---|---|---|
| 1,292,312 | 1/1919 | Gronkwist | 184/18 |
| 1,888,064 | 11/1932 | Barks | 184/7 D |
| 2,035,450 | 3/1936 | Barnes | 184/18 |
| 2,085,814 | 7/1937 | Matthews et al. | 384/378 |
| 2,823,085 | 2/1958 | Keylwert | 92/157 |
| 3,272,092 | 9/1966 | Vielmo et al. | 92/157 |
| 4,363,293 | 12/1982 | Munoz et al. | 92/186 |

FOREIGN PATENT DOCUMENTS

1002564  2/1957  Fed. Rep. of Germany ...... 403/154

*Primary Examiner*—Robert E. Garrett
*Assistant Examiner*—H. Edward Li
*Attorney, Agent, or Firm*—Kenyon & Kenyon

[57] ABSTRACT

The piston pin for a piston of an internal combustion engine is provided with a certain number of passages, each opening into the annular groove of the bearing bushing of the connecting-rod small end and into either of the annular grooves of the pin bearings. The passages are provided in a peripheral portion of the piston pin so to avoid a central portion of the pin, in which a concentration of metallic impurities is maximum.

20 Claims, 5 Drawing Figures

U.S. Patent  Nov. 5, 1985  4,550,647
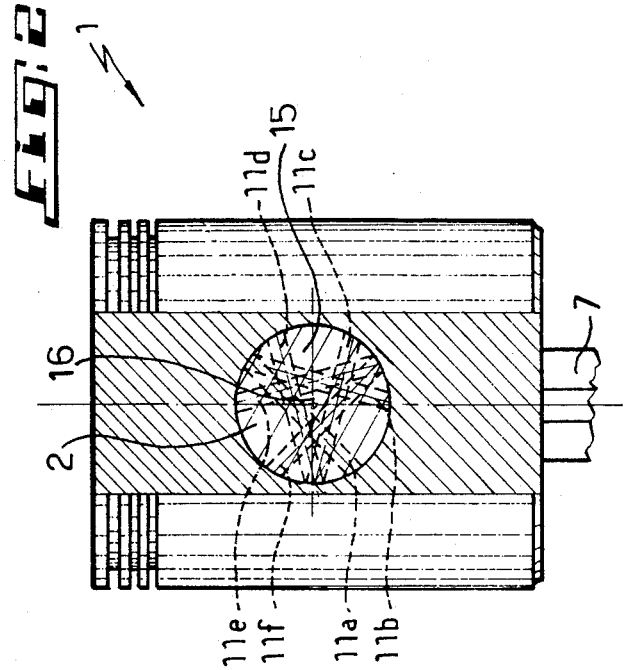
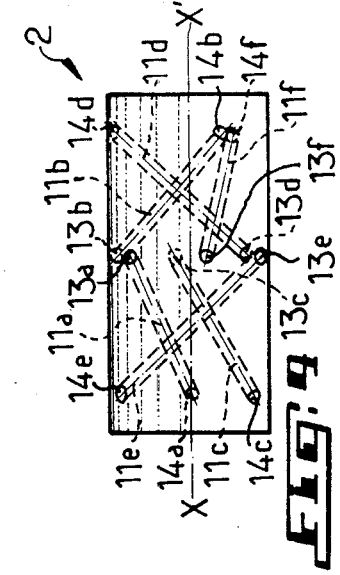
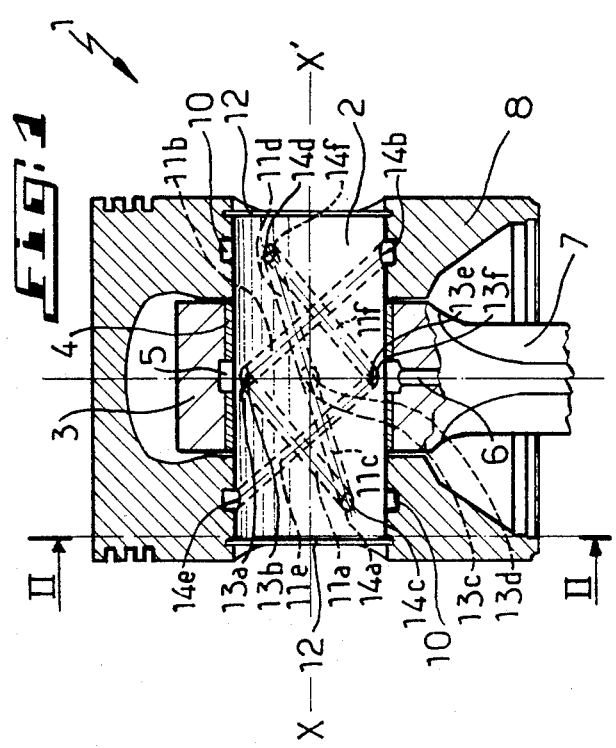
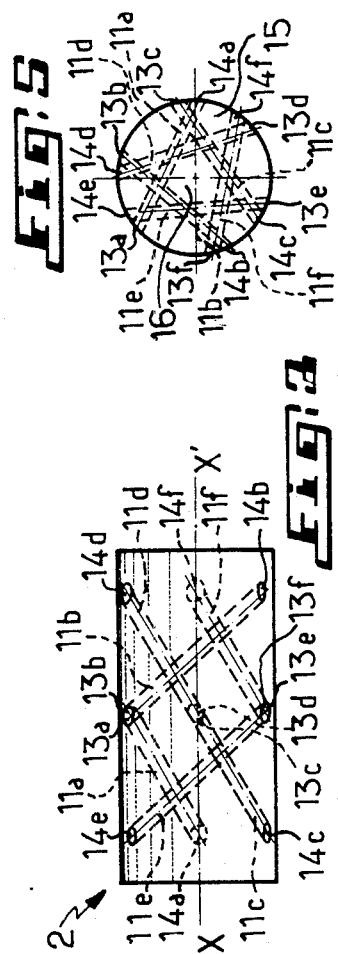

4,550,647

PISTON PIN AND PISTON, NOTABLY FOR AN INTERNAL COMBUSTION ENGINE, EQUIPPED WITH SAID PIN

This application is a continuation of application Ser. No. 497,557 filed May 24, 1983 now abandoned.

The present invention relates to a piston pin for a piston of the type hingedly connected by a substantially cylindrical piston pin to the small end of a connecting rod, the piston pin being rotatably mounted in a bearing bushing of the connecting-rod small end, the bushing being provided with an annular groove located in the longitudinal medial plane of symmetry of the piston pin and of the connecting-rod small end and communicating with the end of a cooling and/or lubricating fluid feed passage extending in the connecting-rod shank and opening at the end surface of the connecting-rod small end, and in two spaced bearings integral with the piston, located on either side of the connecting-rod small end and whose bearing bushings are provided with annular grooves.

In a piston of this type, the known piston pin is generally solid and provided with a certain number of passages, each opening at one end into the annular groove of the bearing bushing of the connecting rod small end, and at the other end into either of the annular grooves of the pin bearings.

The disadvantage of the known piston pin lies in the fact that the passages intersect the longitudinal geometrical axis of the piston pin. Now, in proximity to the axis, there generally accumulate embrittling metallic impurities likely to reduce the resistance of a cavity wall located in that region, and therefore to create incipient cracks and fractures in the passages at those locations. Due to the physics of a cooling alloy mixture and the fact that cylindrical piston pins are made from bars or rods drawn from a cast ingot, it is generally the case that impurities tend to be concentrated in the center of the pins.

The present invention has therefore as a purpose to remedy this disadvantage by providing a piston pin for a piston of the above-mentioned type and characterized in that the passages are provided in a peripheral portion of the piston pin so as to avoid a substantially cylindrical central portion of the pin, in which the concentration of metallic impurities is maximum.

According to another feature of the invention, the diameter of said cylindrical central portion is at least equal to about one tenth of the diameter of the piston pin.

According to another feature of the invention, at least two of said passages converge towards an opening into the annular groove of the bearing bushing of the connecting-rod small end.

According to another feature of the invention, two passages converge towards the aforesaid opening into the annular groove of the bearing bushing of the connecting-rod small end and open at their other ends respectively into the annular grooves of the pin bearings. There can be provided three pairs of the aforesaid passages, the points of convergence of the longitudinal axes of the passages preferably being spaced 120° from one another, as well as the ends of the longitudinal axes of the said passages opening into the annular grooves of the pin bearings.

According to another feature of the invention, each point of convergence of the longitudinal axes of the passages and the two ends of the passages opening respectively into the annular grooves of the pin bearings may be aligned along a generatrix of the piston pin.

According to still another feature of the invention, the piston pin is provided with three pairs of said passages, each pair comprising a passage connecting the annular groove of one of the pin bearings to the annular groove of the bearing bushing of the connecting-rod small end, and a passage connecting the annular groove of the other pin bearing to the annular groove of the bearing bushing of the connecting-rod small end, the ends of said passages opening into the annular groove of the bearing bushing of the connecting-rod small end being angularly spaced 60° from one another. Furthermore, the ends of said passages opening into the grooves of the pin bearings are preferably angularly spaced 120° from one another. Lastly, the openings of the passages at the annular groove of the bearing bushing of the connecting-rod small end pertain to the passages connecting the annular groove of the bearing bushing of the connecting-rod small end to alternately either annular groove of the pin bearings.

The invention will be better understood, and other purposes, features, details and advantages will appear more clearly as the following explanatory description proceeds with reference to the appended diagrammatic drawings given solely as non-limitative examples of presently preferred specific forms of embodiment of the invention, and wherein:

FIG. 1 is a partial sectional view of a piston provided with a piston pin according to the invention;

FIG. 2 is a sectional view upon the line II—II of FIG. 1;

FIG. 3 is a view of a piston pin according to another form of embodiment of the invention;

FIG. 4 is a view of a piston pin according to still another form of embodiment of the invention, and FIG. 5 is a right end view of the piston pin of FIG. 4.

Referring more particularly to FIGS. 1 and 2, the piston 1, which may be of an internal combustion engine, equipped with the piston pin 2 according to the invention, is of the type hingedly connected by the piston pin 2 to a connecting-rod small end 3, the piston pin 2 being mounted rotatably in a bearing bushing 4 of the connecting-rod small end 3. The bushing is provided with an annular groove 5 located in the longitudinal medial plane of symmetry of the piston pin 2 and in the longitudinal medial plane of symmetry of the connecting-rod small end 3. The annular groove 5 communicates with the end of a cooling and/or lubricating fluid (in particular oil) feed passage 6 extending in the connecting-rod shank 7 and opening onto the end surface of the connecting-rod small end 3. The piston pin 2 is also rotatably mounted in two spaced bearings 8 integral with the piston, located on either side of the connecting-rod small end 3 and provided with annular grooves 10.

The piston pin 2 is provided with a certain number of passages 11a to 11f, preferably straight, each opening at one end 13a to 13f into the annular groove 5 of the bearing bushing 4 of the connecting-rod small end 3 and, at the other end 14a to 14f, into either of the annular grooves 10 of the pin bearings 8.

According to the invention, the passages 11a–11f are provided in a peripheral portion 15 of the said piston pin 2 so as to avoid a substantially cylindrical and coaxial central portion 16 of the pin in which the concentration of metallic impurities is maximum. This arrangement obviates the risk of creating incipient cracks and fractures in the central region of the piston pin where there generally accumulate embrittling metallic impurities and avoids the concentrations of stresses resulting from diametral passages. The diameter of the cylindrical central portion 16 is at least equal to about one tenth of the diameter of the piston pin 2. For example, as represented in FIG. 2, the diameter of central portion 16 is equal to about one tenth of the diameter of the piston pin; as represented in FIG. 5, the size of the central portion is about equal to one third of the pin diameter. In any case, the passages do not intersect the longitudinal geometrical axis X—X' of the piston pin, nor the immediately surrounding region. Furthermore, the passages 11a-11f are arranged so as not to lie in a common plane that is parallel to the pin axis.

The passages 11a-11f may be drilled in such a manner that at least one of the passages converge towards an opening into the annular groove 5 of the bearing bushing 4 of the connecting-rod small end 3. In particular, two passages converge towards such an opening, whereas their other ends open respectively into other annular grooves 10 of the pin bearings 8. In the specific form of embodiment illustrated in FIGS. 1 and 2, the piston pin 2 is traversed by three pairs of rectilinear passages 11a,11b;11c,11d;11e,11f, which converge by twos towards openings 13a,13b;13c,13d;13e,13f into the annular groove 5 of the bearing bushing 4 of the connecting-rod small end 3, thus defining in said groove an opening common to both passages. As shown, the other ends 14a,14b;14c,14d;14e,14f of the passages open in the other annular grooves 10 of the pin bearings 8, respectively. In other words, considering a pair of passages 11a,11b, the end 14a of the passage 11a, for example, opens into an annular groove 10 of one pin bearing 8, whereas an end 14b of the passage 11b opens into the annular groove of the other pin bearing, the other ends 13a,13b of the passages 11a,11b opening through a common orifice into the annular groove 5 of the bearing bushing 4 of the connecting-rod small end 3. In the form of embodiment illustrated, the same applies to each of the other pairs of passages, it being understood that the number of pairs of passages is by no means limited to three.

Furthermore, the points of convergence of the passages 11a,11b;11c,11d;11e,11f, are preferably angularly spaced 120° from one another, and so are the ends of said grooves opening into the annular grooves 10 of the pin bearings 8.

According to the form of embodiment of the piston pin illustrated in FIG. 3, it being understood that the latter can be used in a piston of the type defined above, each point of convergence of the passages 11a-11f and the two ends of the passages opening respectively into the annular grooves 10 of the pin bearings 8 are aligned along a generatrix of the piston pin 2. In the example illustrated, the piston pin is provided with three pairs 11a,11b;11c,11d;11e,11f of passages. In this case, the points of convergence of the passages, as well as the ends of the passages opening into the annular grooves of the pin bearings are angularly spaced 120° from one another. Furthermore, considering for example the pair of passages 11a,11b, the ends 13a,13b of the latter converge to an opening into the annular groove 5 of the bearing bushing 4 of the connecting-rod small end, which opening is aligned along a generatrix of the piston pin 2 with the ends 14e,14d of the passages 11e,11d, respectively, opening into annular grooves 10 of the pin bearings 8, respectively. The same applies to the common ends 13c,13d of the passages 11c and 11d, and the ends 14a,14f of the passages 11a and 11f, respectively, as well as to the common ends 13e,13f of the passages 11e,11f, and the ends 14c,14b of the passages 11c,11b, respectively. This configuration is of course illustrated by way of example, any other configuration in which each point of convergence of the passages and the two ends of the passages opening respectively into the annular grooves of the pin bearings are aligned along a generatrix of the piston pin, also forms part of the invention.

According to the form of embodiment of the piston pin illustrated in FIGS. 4 and 5, it being understood that the latter can be used in a piston of the above-defined type, the piston pin 2 is provided with three pairs of passages 11a-11f, this number being of course given non-limitatively. Each pair comprises a passage 11a,11c,11e connecting the annular groove 10 of one of the pin bearings 8 to the annular groove 5 of the bearing bushing 4 of the connecting-rod small end 3 and a passage 11b,11d,11f conneting the annular groove 10 of the other pin bearing 8 to the annular groove 5 of the bearing bushing 4 of the connecting-rod small end 3. The ends 13a-13f, which here are provided independently, of the passages 11a-11f open into the annular groove 5 of the bearing bushing 4 of the connecting-rod small end and are angularly spaced for example 60° from one another. Likewise, the ends 14a-14f of the passages 11a-11f open into the annular grooves 10 of the pin bearings 8 and are angularly spaced for example 120° from one another. For example, the passages 11a-11f may be provided in such a manner that their ends 13a-13f opening into the annular groove 5 of the bearing bushing 4 of the connecting-rod small end 3 pertain to the passages 11a,11c,11e and 11b,11d,11f, respectively, connecting the annular groove 5 of the bearing bushing 4 of the connecting-rod small end to, alternately, annular grooves 10 of the bearing bushings 9 of the pin bearings 8.

It is quite obvious that the piston pin according to the invention is secured in its housing by any appropriate means such as for example locking rings or circlips 12.

What is claimed is:

1. A cylindrical piston pin for pivotally connecting a piston to the piston end of a connecting rod, the piston pin having a first end, a second end, a cylindrical outer surface, and a plurality of straight internal passages, at least one of said passages having one end opening through the cylindrical outer surface of the pin in a region midway between the ends of the pin and another end opening through the cylindrical outer surface of the pin at a location axially spaced from the opening of the one end of the passage toward the first end of the pin, wherein the improvement comprises:
   the piston pin has a completely solid substantially cylindrical and coaxial central portion, the central portion having a diameter of at least one tenth of the diameter of the piston pin, and
   said passages are provided in a peripheral portion of the piston so as to avoid said solid central portion.

2. A piston pin according to claim 1, wherein at least another of said passages has one end opening through the cylindrical outer surface of the pin in said region midway between the ends of the pin and another end opening through the cylindrical outer surface of the pin at a location spaced toward the second end of the pin, and said passages do not lie in a plane that is parallel to the axis of the pin.

3. A piston pin according to claim 2, wherein said one and another of said passages converge towards their one ends opening through the cylindrical outer surface of the pin in said region midway between the ends of the pin.

4. A piston pin according to claim 1, wherein a pair of said passages converge towards respective one ends opening through the cylindrical outer surface of the pin in said region midway between the ends of the pin, and the other ends of said pair of passages open through the cylindrical outer surface of the pin at locations spaced respectively toward the first and second ends of the piston pin.

5. A piston pin according to claim 4, wherein there are provided three of said pairs of passages.

6. A piston pin according to claim 5, wherein the points of convergence of said pairs of passages are angularly spaced 120 degrees from one another, and the other ends of said passages opening through the cylindrical outer surface of the pin are also spaced 120 degrees from one another.

7. A piston pin according to claim 5, wherein the point of convergence of each pair of said passages and two other ends of passages opening through the cylindrical outer surface of the pin at locations spaced axially toward the first and second ends of the pin, respectively, are aligned along a generatrix of the piston pin.

8. A piston pin according to claim 7, wherein the one ends of said passages opening through the cylindrical outer surface of the pin in the region midway between the ends of the pin pertain to the passages connecting the cylindrical outer surface of the pin in the region midway between the ends of the pin alternately to the cylindrical outer surface of the pin at the locations spaced axially toward the first and second ends of the pin.

9. A piston pin according to claim 1, wherein said piston pin is provided with three pairs of said passages, each pair comprising a first passage connecting a location on the cylindrical outer surface of the pin axially spaced toward the first end of the pin with the region on the cylindrical outer surface of the pin midway between the ends of the pin and a second passage connecting a location on the cylindrical outer surface of the pin axially spaced toward the second end of the pin with the region on the cylindrical outer surface of the pin midway between the ends of the pin, the ends of said passages that open through the cylindrical outer surface of the pin in the region midway between the ends of the pin being angularly spaced 60 degrees from each other.

10. A piston pin according to claim 9, wherein the other ends of said passages opening through the cylindrical outer surface of the pin at locations spaced axially toward the first and second ends of the pin are angularly spaced 120 degrees from one another.

11. A piston assembly for an internal combustion engine, said assembly comprising a piston having two spaced apart bearings provided with annular grooves, a piston rod including a shank having a lubricating feed passage extending therethrough and a small end provided with a bearing bushing at one end of the shank, said bearing bushing being provided with an annular groove communicating with the lubricating feed passage, and a substantially cylindrical piston pin rotatably mounted in said small end bearing bushing and said two spaced apart piston bearings located one on either side of the connecting rod small end, said piston pin having a substantially cylindrical solid central portion, coaxial with the pin, said solid central portion having a diameter at least equal to one tenth of the diameter of the piston pin, and a plurality of internal passages, each passage having one end opening into the annular groove of said bearing bushing of the connecting rod small end and another end opening into either of said annular grooves of the piston bearings, wherein said passages are provided in a peripheral portion of the piston pin so as to avoid the central portion of said pin.

12. A piston assembly according to claim 11, wherein said passages do not lie in a common plane parallel to the axis of the pin.

13. A piston assembly according to claim 11, wherein at least two of said passages converge towards their one ends opening into said annular groove of the bearing bushing of the connecting rod small end.

14. A piston assembly according to claim 13, wherein the other ends of said at least two passages which converge towards their one ends opening into said annular groove of the bearing bushing of the connecting rod small end open into the two annular grooves of the piston bearings, respectively.

15. A piston assembly according to claim 13, wherein the piston pin includes three of said pairs of passages.

16. A piston assembly according to claim 15, wherein the points of convergence of said pairs of passages are angularly spaced 120 degrees from one another, and the other ends of said passages opening into the annular grooves of the piston bearings are also spaced 120 degrees from one another.

17. A piston assembly according to claim 15, wherein the point of convergence of each pair of said passages and two other ends of passages opening into the annular grooves of the two piston bearings, respectively, are aligned along a generatrix of the piston pin.

18. A piston assembly according to claim 17, wherein the one ends of said passages opening into the annular groove of the bearing bushing of the connecting rod small end pertain to the passages connecting the annular groove of the bearing bushing of the connecting rod small end alternately to the annular grooves of the two piston bearings.

19. A piston assembly according to claim 11, wherein said piston pin is provided with three pairs of said passages, each pair comprising a first passage connecting the annular groove of one of the piston bearings to the annular groove of the bearing bushing of the connecting rod small end and a second passage connecting the annular groove of the other piston bearing to the annular groove of the bearing bushing of the connecting rod small end, the ends of said passages that open into the annular groove of the bearing bushing of the connecting rod small end being angularly spaced 60 degrees from one another.

20. A piston assembly according to claim 19, wherein the other ends of said passages opening into the annular groove of each of the piston bearings are angularly spaced 120 degrees from one another.

* * * * *